United States Patent
Suzuki et al.

(10) Patent No.: US 6,908,386 B2
(45) Date of Patent: Jun. 21, 2005

(54) GAME DEVICE CHANGING SOUND AND AN IMAGE IN ACCORDANCE WITH A TILT OPERATION

(75) Inventors: Toshiaki Suzuki, Kyoto (JP); Kazumi Totaka, Kyoto (JP); Yoji Inagaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 9 days.

(21) Appl. No.: 10/424,831

(22) Filed: Apr. 29, 2003

(65) Prior Publication Data

US 2003/0216179 A1 Nov. 20, 2003

(30) Foreign Application Priority Data

May 17, 2002 (JP) ........................................ 2002-142503

(51) Int. Cl.[7] .............................................. A63F 13/00
(52) U.S. Cl. .......................................... 463/30; 463/35
(58) Field of Search ............................ 463/30, 31, 32, 463/35, 36, 37, 38, 43, 44

(56) References Cited

U.S. PATENT DOCUMENTS

| | | | |
|---|---|---|---|
| 977,523 A | 12/1910 | Gustafson | |
| 1,309,888 A | 7/1919 | Gibson | |
| 1,443,982 A | 2/1923 | Endean | |
| 1,576,905 A | 3/1926 | Gerster | |
| 1,626,567 A | 4/1927 | Steinbrecht | |
| 1,866,596 A | 7/1932 | Hendrickson | |
| 2,338,811 A | 1/1944 | Hasbrook | |
| 2,600,363 A | 6/1952 | Morris | |
| 3,046,676 A | 7/1962 | Hermann et al. | |
| 3,204,233 A | 8/1965 | Olliff | |
| 3,793,483 A | 2/1974 | Bushnell | |
| 3,809,395 A | 5/1974 | Allison, Jr. et al. | |
| 3,863,067 A | 1/1975 | Gooley | |
| RE28,507 E | 8/1975 | Rusch | |
| 3,950,859 A | 4/1976 | Kramer | |
| 4,093,221 A | 6/1978 | Dash | |
| 4,107,642 A | 8/1978 | Crummett | |
| 4,285,523 A | 8/1981 | Lemelson | |
| 4,296,930 A | 10/1981 | Frederiksen | |
| 4,318,245 A | 3/1982 | Stowell et al. | |
| 4,337,948 A | 7/1982 | Breslow et al. | |
| 4,425,488 A | 1/1984 | Moskin et al. | |
| 4,439,156 A | 3/1984 | Marshall et al. | |

(Continued)

FOREIGN PATENT DOCUMENTS

| | | | |
|---|---|---|---|
| DE | 3437 456 | 9/1985 | |
| GB | 2 317 086 | 3/1998 | |
| GB | 2 331 686 | 5/1999 | |
| JP | 60-7128 | 1/1985 | |
| JP | 61-194231 | 12/1986 | |
| JP | 7-24141 | 1/1995 | |
| JP | 10-21000 | 1/1998 | |
| JP | 11-249653 | * 9/1999 | ............. A63F/9/22 |
| JP | 2001-170358 | 6/2001 | |

OTHER PUBLICATIONS

Specification for ADXL150/ADXL250, pp. 1–15, 1998.

*Primary Examiner*—Kim Nguyen
(74) *Attorney, Agent, or Firm*—Nixon & Vanderhye, P.C.

(57) ABSTRACT

Character data including an image generation program, image data, a sound program, and sound data, which are previously determined for each of characters used in a game, is stored in a game device 10. A controller 12 having a built-in tilt sensor 12c is connected to the game device, and operated by a player performing a tilt operation. The image generation program and the sound program concurrently process the image data and the sound data, respectively, using the same tilt data output from the tilt sensor. As a result, an image and sound of the character are concurrently changed in accordance with the tilt operation of the controller. Thus, it is possible to provide the game device enhancing the realism and the staging effects of the game.

12 Claims, 6 Drawing Sheets

U.S. PATENT DOCUMENTS

| | | |
|---|---|---|
| 4,445,011 A | 4/1984 | Hansen |
| 4,450,325 A | 5/1984 | Luque |
| 4,503,299 A | 3/1985 | Henrard et al. |
| 4,503,622 A | 3/1985 | Swartz et al. |
| 4,516,329 A | 5/1985 | Dilcox |
| 4,524,348 A | 6/1985 | Lefkowitz |
| 4,534,735 A | 8/1985 | Allard et al. |
| 4,540,176 A | 9/1985 | Baer |
| 4,542,903 A | 9/1985 | Yokoi et al. |
| 4,552,360 A | 11/1985 | Bromley et al. |
| 4,554,535 A | 11/1985 | Floris et al. |
| 4,567,479 A | 1/1986 | Boyd |
| 4,578,674 A | 3/1986 | Baker et al. |
| 4,591,250 A | 5/1986 | Woodruff |
| 4,639,222 A | 1/1987 | Vishlizky |
| 4,644,662 A | 2/1987 | Anderson et al. |
| 4,672,541 A | 6/1987 | Bromley et al. |
| 4,687,200 A | 8/1987 | Shirai |
| 4,695,266 A | 9/1987 | Hui |
| 4,721,308 A | 1/1988 | Trimble |
| 4,739,128 A | 4/1988 | Grisham |
| 4,747,216 A | 5/1988 | Kelly et al. |
| 4,787,051 A | 11/1988 | Olson |
| 4,804,897 A | 2/1989 | Gordon et al. |
| 4,817,950 A | 4/1989 | Goo |
| 4,839,838 A | 6/1989 | LaBiche et al. |
| 4,862,152 A | 8/1989 | Milner |
| 4,866,850 A | 9/1989 | Kelly et al. |
| 4,895,376 A | 1/1990 | Chiang Shiung-Fei |
| 4,922,756 A | 5/1990 | Henrion |
| 4,925,189 A | 5/1990 | Braeunig |
| 4,957,291 A | 9/1990 | Miffitt et al. |
| 4,969,647 A | 11/1990 | Mical et al. |
| 4,977,404 A | 12/1990 | Durst et al. |
| 5,059,958 A | 10/1991 | Jacobs et al. |
| 5,068,645 A | 11/1991 | Drumm |
| 5,127,658 A | 7/1992 | Openiano |
| 5,128,671 A | 7/1992 | Thomas, Jr. |
| 5,181,181 A | 1/1993 | Glynn |
| 5,184,830 A | 2/1993 | Okada et al. |
| 5,329,276 A | 7/1994 | Hirabayashi |
| 5,339,095 A | 8/1994 | Redford |
| D351,430 S | 10/1994 | Barr |
| 5,363,120 A | 11/1994 | Drumm |
| 5,396,265 A | 3/1995 | Ulrich et al. |
| 5,453,758 A | 9/1995 | Sato |
| 5,526,022 A | 6/1996 | Donahue et al. |
| 5,598,187 A | 1/1997 | Ide et al. |
| 5,602,569 A | 2/1997 | Kato |
| 5,611,731 A | 3/1997 | Bouton et al. |
| 5,615,132 A | 3/1997 | Horton et al. |
| 5,624,117 A | 4/1997 | Ohkubo et al. |
| 5,666,138 A | 9/1997 | Culver |
| 5,701,131 A | 12/1997 | Kuga |
| 5,703,623 A | 12/1997 | Hall et al. |
| 5,734,371 A | 3/1998 | Kaplan |
| 5,734,373 A | 3/1998 | Rosenberg et al. |
| 5,739,811 A | 4/1998 | Rosenberg et al. |
| 5,746,602 A | 5/1998 | Kikinis |
| 5,751,273 A | 5/1998 | Cohen |
| 5,752,880 A | 5/1998 | Gabai et al. |
| 5,757,360 A | 5/1998 | Nitta et al. |
| 5,784,794 A | 7/1998 | Nelson |
| 5,795,227 A | 8/1998 | Raviv et al. .................. 463/34 |
| 5,819,206 A | 10/1998 | Horton et al. |
| 5,835,077 A | 11/1998 | Dao et al. |
| 5,854,622 A | 12/1998 | Brannon |
| 5,862,229 A * | 1/1999 | Shimizu ..................... 381/17 |
| 5,898,421 A | 4/1999 | Quinn |
| 5,903,257 A | 5/1999 | Nishiumi et al. ........... 345/157 |
| 5,923,317 A | 7/1999 | Sayler et al. |
| 5,926,438 A | 7/1999 | Saito ......................... 367/111 |
| 5,947,868 A | 9/1999 | Dugan |
| 5,955,713 A | 9/1999 | Titus et al. |
| 5,982,352 A | 11/1999 | Pryor |
| 5,991,085 A | 11/1999 | Rallison et al. |
| 5,999,168 A | 12/1999 | Rosenberg et al. |
| 6,020,876 A | 2/2000 | Rosenberg et al. |
| 6,160,540 A | 12/2000 | Fishkin et al. |
| 6,183,365 B1 | 2/2001 | Tonomura et al. |
| 6,200,219 B1 | 3/2001 | Rudell et al. |
| 6,201,554 B1 | 3/2001 | Lands |
| 6,281,456 B1 | 8/2001 | Ogden |
| 6,375,572 B1 | 4/2002 | Masuyama et al. ........... 463/43 |
| 6,464,585 B1 * | 10/2002 | Miyamoto et al. ............ 463/35 |
| 6,545,661 B1 * | 4/2003 | Goschy et al. .............. 345/158 |
| 6,641,482 B2 | 11/2003 | Masuyama et al. ........... 463/44 |

* cited by examiner

F I G. 2
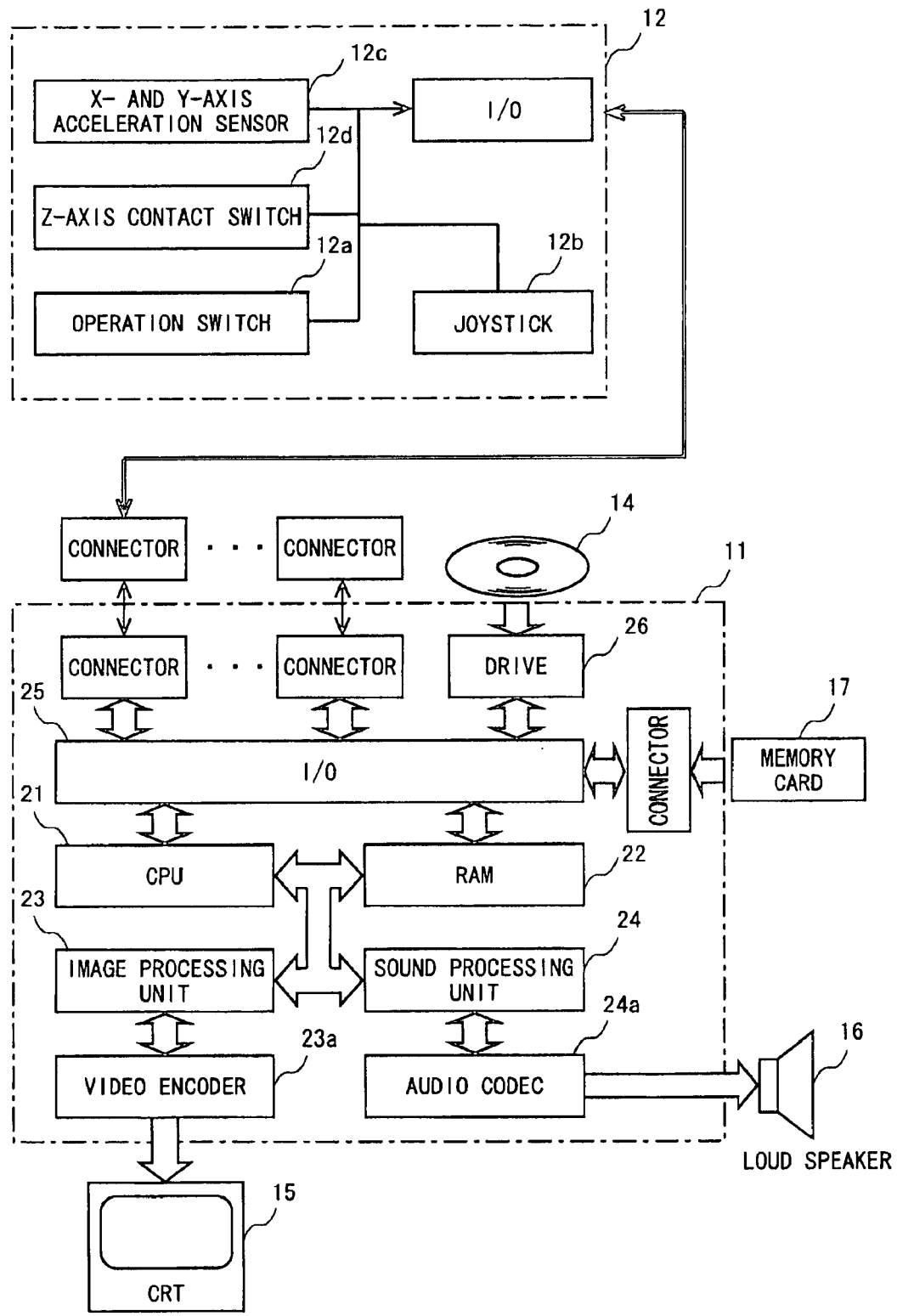

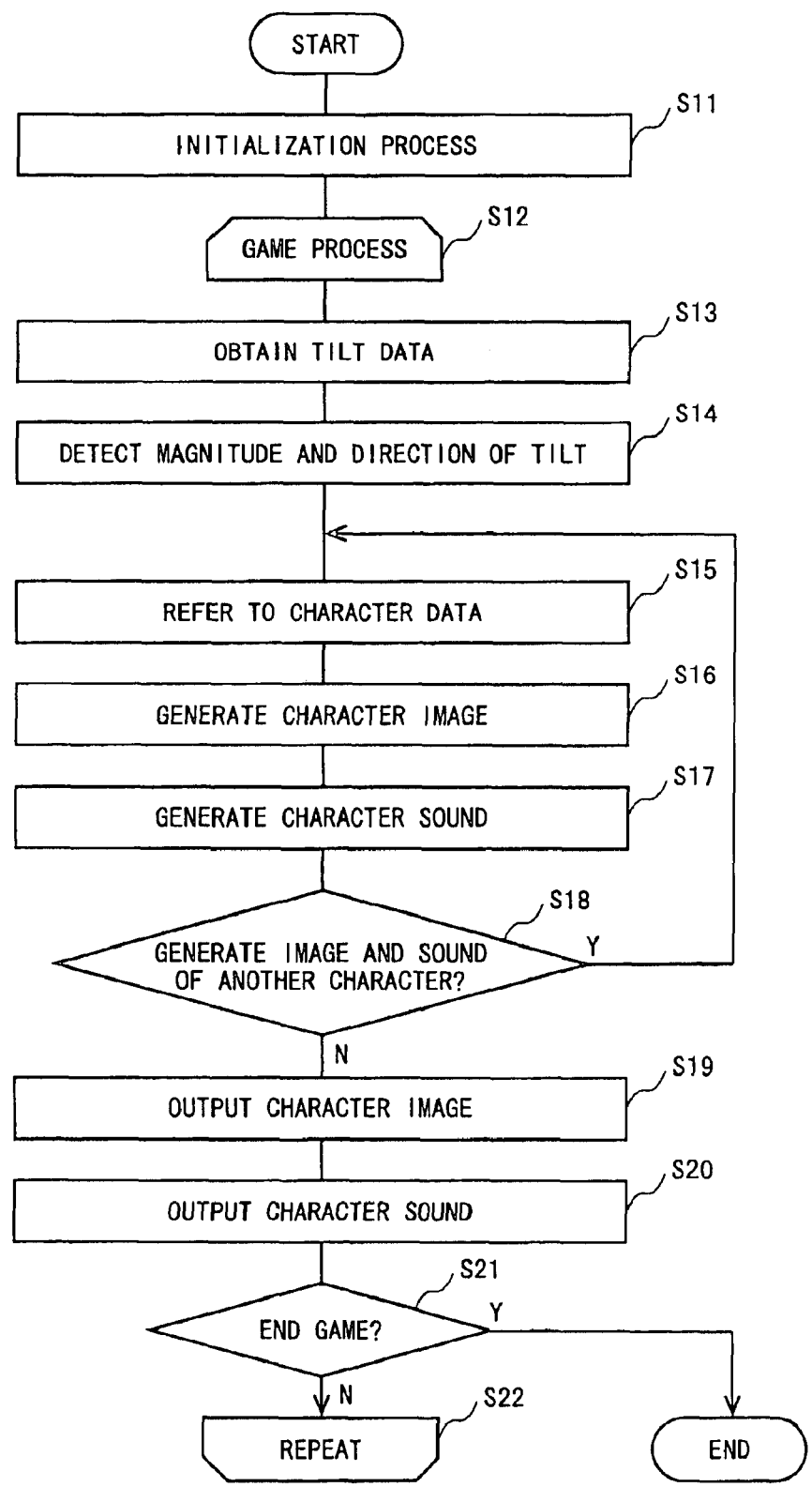

GAME DEVICE CHANGING SOUND AND AN IMAGE IN ACCORDANCE WITH A TILT OPERATION

FIELD OF THE INVENTION

This invention relates to game devices changing sound and images in accordance with a tilt operation. More particularly, this invention relates to a game device changing sound in response to a change in an image of a character in accordance with the tilt of a controller or a handheld game device operated by a player.

BACKGROUND AND SUMMARY OF THE INVENTION

DESCRIPTION OF BACKGROUND ART

There is known a well-known game device using a tilt sensor (or an acceleration sensor), which is disclosed in Japanese Patent Laid-Open Publication No. 2001-170358. There is a game titled "Kirby's Tilt'n Tumble" (R) which is a product using the above-described conventional technique, and is embodied in a handheld game machine released by the applicant of the present invention. The game device as described above allows a moving direction or an amount of movement of a player character to be changed (as a result, a position of a background screen relative to the player character or a scroll is changed) in accordance with a tilt operation performed by a player who tilts a housing of a handheld game device longitudinally or laterally.

In the conventional game device using the tilt sensor, however, the tilt direction and/or the amount of tilt detection is only reflected in an animated image used for rendering a moving character or a moving speed thereof. Thus, the player often finds the game monotonous, and may soon tire of the game.

Therefore, a feature of the exemplary embodiments is to provide a game device producing novel staging effects by concurrently changing a game image of a character, etc., and game sound (imitative sound and music used in the game) in accordance with a tilt operation related to a tilt direction and/or the amount of tilt performed by a player who changes the tilt of a game controller or a handheld game device.

Another feature of the exemplary embodiments is to provide a game device that can enhance the realism of a game by changing a generation mode of game sound in response to a change in an image of a character in accordance with a tilt operation.

Still another feature of the exemplary embodiments is to provide a game device that can further enhance the realism of a game by synergistically enhancing the staging effects produced by an image and sound of the game in accordance with a tilt operation performed for changing various sound factors, such as a tempo, volume, a tone interval of the sound, and the degree of conversion of waveform data that is a sound source, or the like.

The exemplary embodiments have the following features.

A first aspect of an exemplary embodiment is directed to a game device that causes a display to display a game image including a character operated by a player, and causes a sound generator to output game sound corresponding to the character in accordance with an operation performed by the player, comprising: operation controller operated by the player; a tilt detector; game processing circuitry (and associated software); an image storage area; a sound data storage area; an image display processing unit; and a sound output processing unit.

The tilt detector is provided to the operation means for detecting an amount of tilt of the operation means. The game processing circuitry processes a game in accordance with the operation performed by the player. The image storage areas stores image data used for displaying the character. The sound data storage stores sound data of sound to be produced by the character. The image display processing unit reads the image data of the character from the image data storage means and causes the display to display an image of the character. The sound output processing unit reads the sound data from the sound data storage and causes the sound generator to output sound related to the image of the character while the image of the character is displayed by the image display processing unit.

The image display processing unit and the sound output processing unit respond to a change in output of the tilt detector, which changes in accordance with the tilt operation performed by the player with the operation controller, and change the game image displayed by the display and the game sound output from the sound generator concurrently and in an associated manner.

According to a second aspect, in the first aspect, the sound output processing unit changes an interval of reading the sound data from the sound data storage area in accordance with the output of the tilt detector.

According to a third aspect, in the first aspect, the sound data storage stores at least a first type of sound data and a second type of sound data for one character, and the sound output processing unit selects either of the first type of sound data and the second type of sound data based on an output value of the tilt detector and reads the selected first or second type of sound data.

According to a fourth aspect, in the first aspect, the sound output processing unit outputs sound (for example, sound whose frequency, volume, or tone of the sound data has been changed) converted from the sound data read from the sound data storage area by using an output value of the tilt detector.

According to a fifth aspect, in the third aspect, a determination mechanism determines whether or not the output value of the tilt detector is greater than a predetermined value is further included. The first type of sound data corresponds to sound that is used when the displayed character moves faster than a predetermined speed, and the second type of sound data corresponds to sound that is used when the displayed character moves slower than the predetermined speed.

The sound output processing unit reads the first type of sound data when it is determined by the determination mechanism that the output value of the tilt detector is greater than the predetermined value, and reads the second type of sound data when it is determined by the determination mechanism that the output value of the tilt detector is equal to or smaller than the predetermined value.

According to a sixth aspect, in the first aspect, the tilt detector is an acceleration sensor for detecting a magnitude of acceleration exerted at least on a lateral and a longitudinal direction of the game device.

A seventh aspect of an exemplary embodiments is directed to a computer-readable storage medium having stored therein a game program which causes a game device to execute a tilt detecting step, an image display processing step, and a sound output processing step, the game program is executed in the game device including: an operation controller operated by a player; a tilt detector provided to the operation controller for detecting an amount of tilt of the operation controller; a display for displaying a game image; a sound generator for outputting game sound; game processing circuitry for processing the game program in accordance with an operation performed by the player; an image storage for storing image data of a character used for displaying the character; and sound data storage for storing sound data of sound to be produced by the character.

The tilt detecting step detects tilt; of the operation controller. The image display processing step reads the image data from the image data storage and causes the display to display an image of the character. The sound output processing step reads the sound data from the sound data storage and outputs sound related to the image of the character from the sound generator while the image of the character is displayed by the image display processing unit.

In the image display processing step and the sound output processing step, an image displayed by the display and the sound output from the sound generator are changed concurrently and in an associated manner in accordance with the tilt operation performed by the player with the operation controller by using an output detected at the tilt detecting step.

According to an eighth aspect, in the seventh aspect, the sound output processing step changes an interval of reading the sound data from the sound data storage area based on an output value obtained at the tilt detecting step.

According to a ninth aspect, in the seventh aspect, the sound data storage area stores at least a first type of sound data and a second type of sound data for one character. The sound output processing step selects either of the first type of sound data and the second type of sound data based on an output value obtained at the tilt detecting step, and reads the selected first or second type of sound data.

According to a tenth aspect, in the seventh aspect, the sound output processing step includes a sound data converting step of converting the sound data read from the sound data storage means by using an output value obtained at the tilt detecting step.

According to the present exemplary embodiments, it is possible to concurrently change the game image of the character, etc., and the game sound (imitative sound and music used in the game) in accordance with the tilt operation, thereby providing the game device with the ability to realize novel staging effects by changing the image and the sound in an associated manner.

Furthermore, according to the present exemplary embodiments, it is possible to enhance the realism of the game by changing a generation mode of the game sound in response to a change in the image of the character in accordance with the tilt operation.

Still further, according to the present exemplary embodiments, it is possible to further enhance the realism of the game by synergistically enhancing the staging effects produced by the image and the sound of the game in accordance with the tilt operation performed for changing various sound factors, such as a tempo, volume, a tone interval of the sound, and the degree of conversion of waveform data that is a sound source, or the like.

These and other objects, features, aspects and advantages of the present illustrative embodiments will become more apparent from the following detailed description of the present invention when taken in conjunction with the accompanying drawings.

BRIEF DESCRIPTION OF THE DRAWINGS

FIG. 2 is a detailed block diagram showing an internal view of the game device;

FIG. 6 is a flowchart showing a game process of the present invention.

DESCRIPTION OF THE PREFERRED EMBODIMENTS

Figure 1:
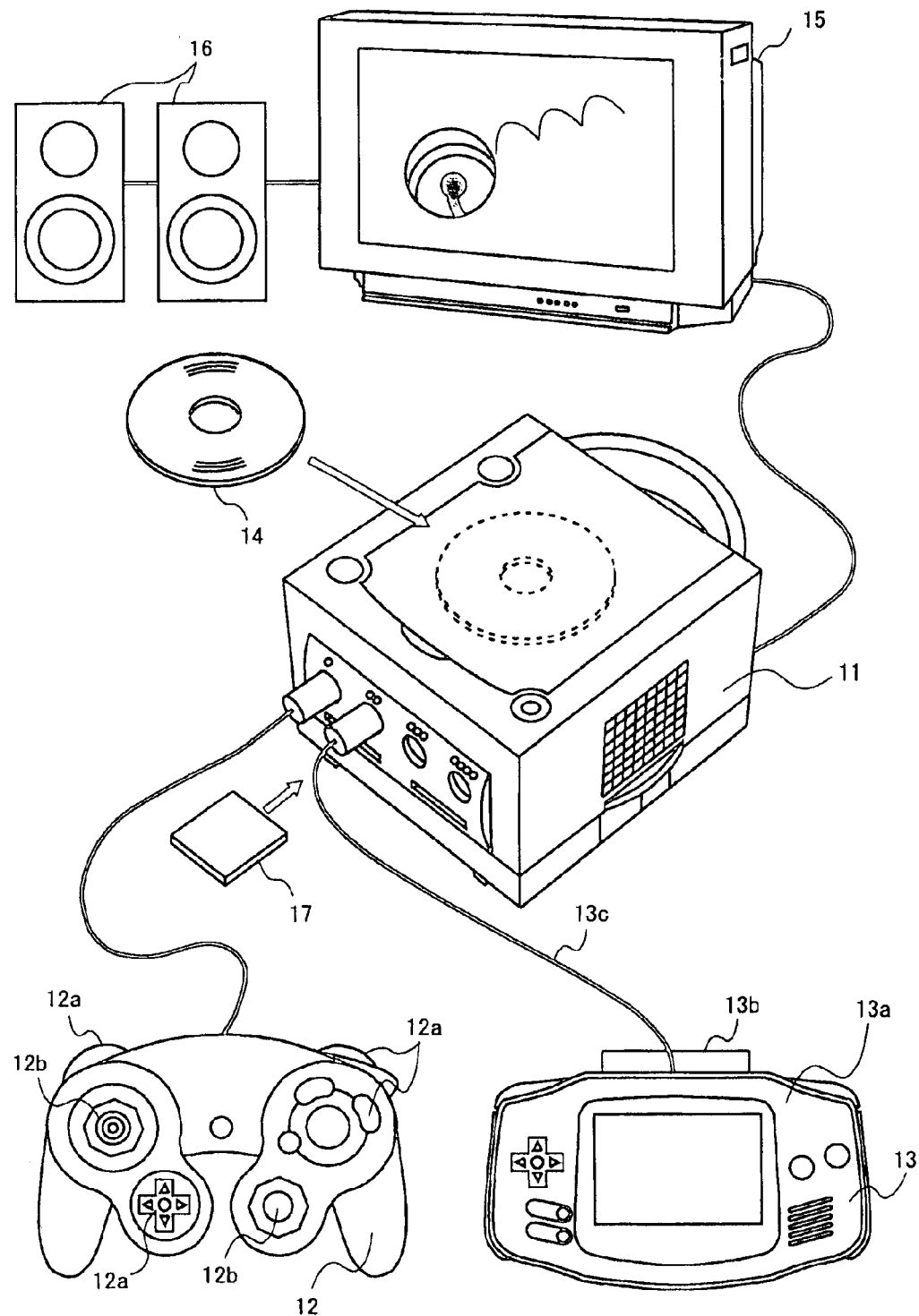
FIG. 1 is a schematic view of a game device of the present invention.

With reference to FIG. 1, a game device of the present invention is described.

In FIG. 1, the game device 10 includes a main unit 11. A controller 12 is connected to the main unit 11. The controller 12 has a built-in tilt sensor 12c (see FIG. 2) detecting the amount of tilt in accordance with a tilt operation performed by a player. Note that a handheld game device 13 capable of providing a tilt detecting function equivalent to the controller 12 may alternatively be connected to the main unit 11. For example, the handheld game device 13 includes a handheld game body 13a. An external storage medium 13b dedicated to the handheld game device 13 can be removably inserted into the handheld game body 13a. If the handheld game body 13a does not have a tilt detection function, the tilt sensor 12c may be built into the external storage medium 13b dedicated to the handheld game device 13. The handheld game body 13a can be connected to the main unit 11 by a connecting cable 13c.

A game program operated in the game device 10 is provided from an external storage medium 14 such as an optical disk, etc. The external storage medium 14 can be removably mounted on the main unit 11. The main unit 11 reads a program stored in the external storage medium 14, and executes the game program. Note that the external storage medium in the form of an optical disk is shown in the drawing, but a storage medium using a semiconductor or a storage medium using a magnetic or a magneto-optical technology may be used. In that case, a reading function corresponding to each medium is provided to the main unit 11. During execution of the game program, a game image is displayed on an image display device 15, and sound is output from a sound output device 16. Note that the sound output device 16 is connected to the image display device 15 in the drawing, but the sound output device 16 may be directly connected to the main unit 11. Furthermore, a data storage medium 17 can be inserted into the main unit 11. The data storage medium 17 can store, for example, processing results of the game program operated in the game device 10. Thus, the player can store the game progress in the data storage medium 17 when the game is temporarily suspended, and resume the game later by reading the stored data.

FIG. 2 is a block diagram showing an internal view of the game device 10. The main unit 11 has a built-in CPU 21 for processing the game program. RAM 22 is connected to the CPU 21. In the RAM 22, a program read from the external storage medium 14, various data used in a game process, and game program processing results of the CPU 21 are temporarily stored. An image processing unit 23 and a sound processing unit 24 are further connected to the CPU 21. The image processing unit 23 and the sound processing unit 24 are also connected to the RAM 22. Furthermore, the CPU 21 can store data about the progress of program processing in the data storage medium 17 via an interface 25.

The CPU 21 is connected to a disk drive 26 via the interface 25. The disk drive 26 has a function of reading a program and data stored in the external storage medium 14. The read program and data are temporarily stored in the RAM 22, and the CPU 21 processes the read program and data as a game program.

The CPU 21 is connected to the controller 12 (or the handheld game device 13) via the interface 25. Hereinafter, the controller 12 and the handheld game device 13 are treated as an equivalent in the following description. The controller 12 includes an operation switch 12a and a joystick 12b. The operation switch 12a detects whether or not a switch is pressed by the player. An operation output detected by the controller 12 is used in game program processing. The joystick 12b is operated by the player for instructing a direction of a game character, for example. If an analog joystick capable of detecting a tilt angle of the stick as well as instructing a direction is used as the joystick 12b, it is possible to provide a game having more involved and interesting features.

The controller 12 further includes an acceleration sensor 12c. The acceleration sensor 12c has the following two functions: a sensor function of outputting the magnitude of acceleration caused in an X-axis direction of the sensor, and a sensor function of outputting the magnitude of acceleration caused in a Y-axis direction thereof. The X-axis direction of the sensor is a rotating direction whose center of rotation corresponds to a longitudinal direction of the operation surface of the controller 12, and the Y-axis direction thereof is a rotating direction whose center of rotation corresponds to a lateral direction of the operation surface of the controller 12. More specifically, for example, if the controller 12 is slowly tilted to the right (see FIG. 4 (51)), modest acceleration is caused in a positive direction of an X-axis. The acceleration sensor 12c outputs the resultant modest acceleration as data. Similarly, for example, if the top portion of the controller 12 is heavily tilted downward (see FIG. 4 (53)), significant acceleration is caused in a positive direction of a Y-axis. The acceleration sensor 12c outputs the resultant significant acceleration as data. The CPU 21 can accept these outputs from the acceleration sensor 12c via the interface 25, and use these outputs in the game program processing.

The controller 12 may further include a Z-axis contact switch 12d. The Z-axis contact switch 12d is a digital sensor for detecting a movement of the controller 12 in a Z-axis direction (a direction vertical to the operation surface of the controller 12). When the controller 12 is moved up and down in the Z-axis direction, for example, the above-described detection function allows an output corresponding to the movement to be obtained, whereby it is possible to realize a game including novel staging effects using the above-described resultant output. In place of the Z-axis contact switch 12d, the acceleration sensor 12c additionally including a Z-axis acceleration sensor may be used.

The image processing unit 23 processes, based on an instruction from the CPU 21 performing program processing, image data stored in the external storage medium 14, or image data generated as a result of the program processing and stored in the RAM 22. The processed image data is displayed on the image display device 15 via a video encoder 23a.

The sound processing unit 24 processes, based on an instruction from the CPU 21 performing the program processing, sound data stored in the external storage medium 14, or sound data generated as a result of the program processing and stored in the RAM 22. The processed sound data is output to the sound output device 16 via an audio codec 24a.

Figure 3:
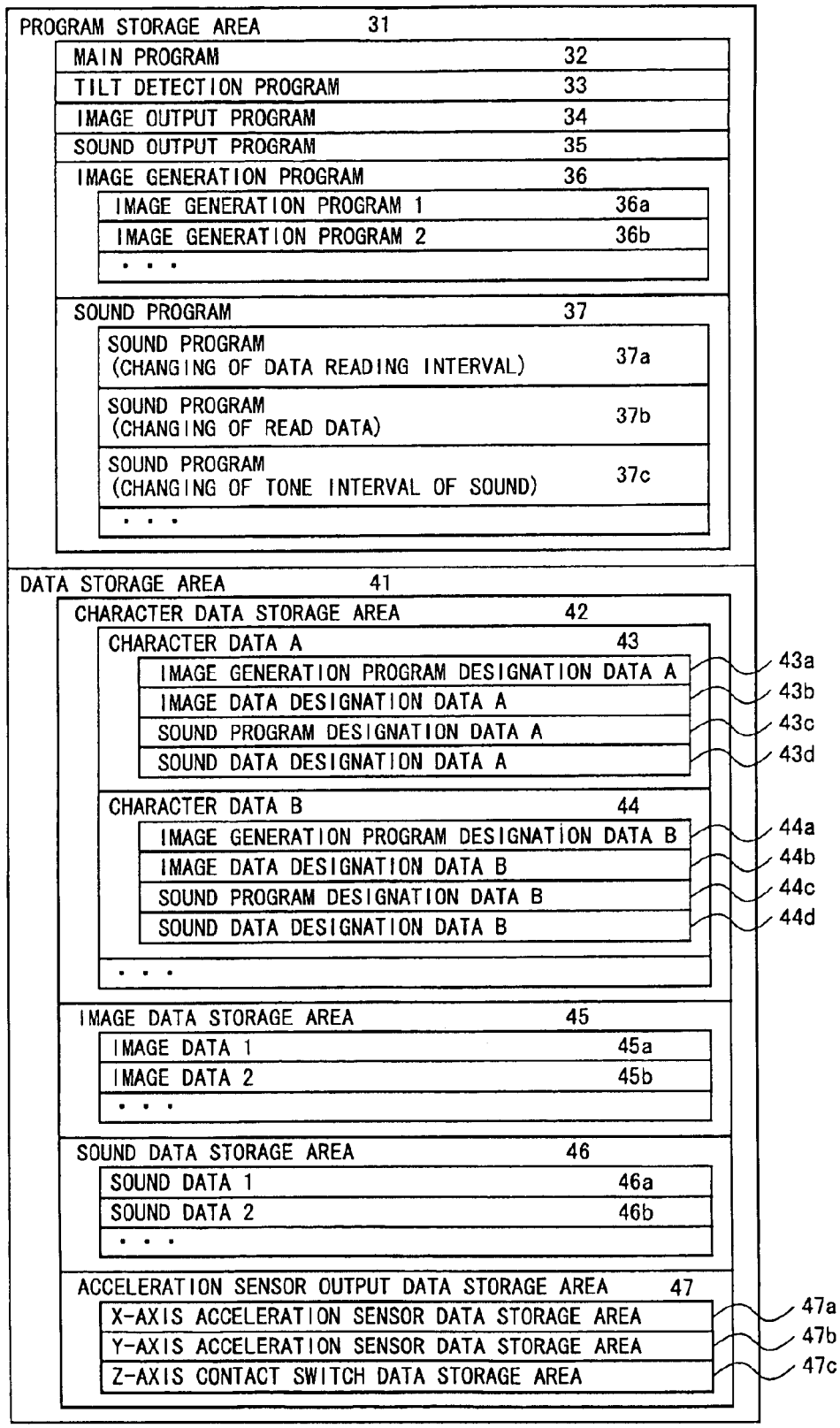
FIG. 3 is a memory map of the game device.

FIG. 3 is a memory map 30 of the RAM 22 during execution of the game program. The RAM 22 broadly includes a program storage area 31 and a data storage area 41. The program storage area 31 stores various programs to be processed by the CPU 21 when executing the game program in the game device 10. The data storage area 41 stores various data to be used when these programs are executed. The above-described various programs stored in the program storage area 31 are each previously stored in the external storage medium 14, and read into the RAM 22 therefrom. The data stored in the data storage area 41 is the data previously stored in the external storage medium 14, or the data generated as a result of the program processing. After specific program processing is performed, it is also possible to read necessary data from the external storage medium 14 and temporally store the read data in the data storage area.

The program storage area 31 includes a main program storage area 32, a tilt detection program storage area 33, an image output program storage area 34, a sound output program storage area 35, an image generation program storage area 36, and a sound program storage area 37.

The main program storage area 32 stores a main program for executing the game according to the present invention in the game device 10. The tilt detection program storage area 33 stores a program for detecting the amount of tilt from acceleration sensor output data stored in the data storage area 41. More specifically, the tilt detection program storage area 33 stores a program for calculating a tilt direction of the controller based on data indicating the magnitude of acceleration caused in the X-axis direction and data indicating the magnitude thereof caused in the Y-axis direction, which are output from the acceleration sensor 12c. Changing the tilt of the controller is a basic operation of the present invention.

The image output program storage area 34 stores a program for generating an image, which is to be finally output from the image display device 15, from image data processed by a program stored in the image generation program storage area 36.

The sound output program storage area 35 stores a program for generating sound, which is to be finally output from the sound output device 16, from sound data processed by the sound program storage area 37.

The image generation program storage area 36 stores programs which are uniquely used for each of various characters, respectively, and processed using image data stored in an image data storage area 45. The sound program storage area 37 stores programs which are uniquely used for each of various characters, respectively, and processed using sound data stored in a sound data storage area 46.

The data storage area 41 stores data used in a program stored in the program storage area 31. The data storage area 41 includes a character data storage area 42, the image data storage area 45, the sound data storage area 46, and an acceleration sensor output data storage area 47.

The character data storage area 42 stores data (character data A, character data B) about various characters (a character A and a character B, for example) used in the game, and includes a character A data storage area 43 and a character B data storage area 44, for example. More specifically, for example, the character A data storage area 43 includes an image generation program designation data A storage area 43a, an image data designation data A storage area 43b, a sound program designation data A storage area 43c, and a sound data designation data A storage area 43d.

The image generation program designation data A storage area 43a stores data for designating a specific image generation program that is uniquely used for the character A and stored in the image generation program storage area 36. The image data designation data A storage area 43b stores data for designating specific image data which is uniquely used for the character A and stored in the image data storage area 45. The sound program designation data A storage area 43c stores data for designating a specific sound program which is uniquely used for the character A and stored in the sound program storage area 37. The sound data designation data A storage area stores data for designating specific sound data which is uniquely used for the character A and stored in the sound data storage area 46.

Assume that, as the character data A, an image generation program 2 is designated by the image generation program designation data, an image data 1 is designated by the image data designation data, a sound program 1 is designated by the sound program designation data, and sound data 1 is designated by the sound data designation data. In this case, if an operation is performed so that the controller 12 included in the game device according to the present invention is tilted, the image generation program 2 generates a unique image of the character A using the image data 1, and the sound program 1 generates sound unique to the character A using the sound data 1 based on the above-described operation.

Similarly, with regard to the character data B, the character B data storage area 44 includes an image generation program designation data B storage area 44a, an image data designation data B storage area 44b, a sound program designation data B storage area 44c, and a sound designation data B storage area 44d, which are used for designating a program or data uniquely used for the character B.

The image data storage area 45 stores image data (image data 1, image data 2, for example) of various characters, which is displayed in the game.

The sound data storage area 46 stores sound data (sound data 1, sound data 2, for example) of various characters, which is output in the game.

The acceleration sensor output data storage area 47 further includes an X-axis acceleration sensor data storage area 47a, a Y-axis acceleration sensor data storage area 47b, and a Z-axis contact switch data storage area 47c.

The X-axis acceleration sensor data storage area 47a stores data indicating the magnitude of X-axis acceleration output from the acceleration sensor 12c. The Y-axis acceleration sensor data storage area 47b stores data indicating the magnitude of Y-axis acceleration output from the acceleration sensor 12c. The Z-axis contact switch data storage area 47c stores data indicating an ON/OFF status of the Z-axis contact switch.

Figure 4:
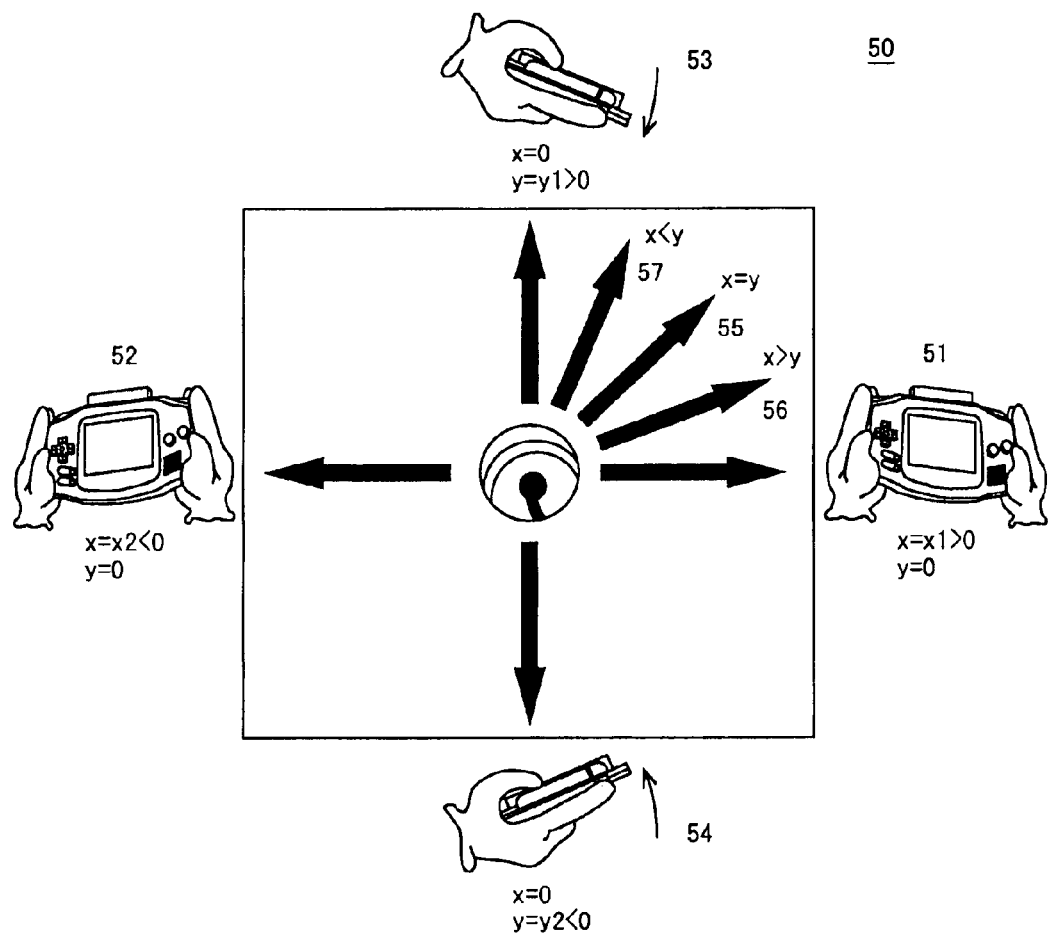
FIG. 4 is an illustration showing an exemplary movement of a character in accordance with a tilt operation.

FIG. 4 is a schematic illustration 50 showing a tilt direction of the controller and a movement of a game character 60 moving corresponding to a tilt operation of the controller. In the schematic illustration 50, the Y-axis acceleration sensor data storage area 47b stores the Y-axis acceleration data y=0 in a state 51 in which the controller (in this illustration, the handheld game device 13 is used) is tilted to the right. The X-axis acceleration data x=x1 in the state 51 is output from the acceleration sensor 12c as a positive value, and stored in the X-axis acceleration sensor data storage area 47a. In this case, an image is generated so that a screen in which the character 60 rolls over to the right is displayed. On the other hand, in a state 52 in which the controller is tilted to the left, the Y-axis acceleration data is also y=0, but the X-axis acceleration data x=x2 is stored as a negative value. In this case, an image is generated so that a screen in which the character 60 rolls over to the left is displayed. Similarly, in a state 53 in which the top portion of the controller is tilted downward, the X-axis acceleration data is x=0, and the Y-axis acceleration data y=y1 is a positive value. In this case, an image is generated so that a screen in which the character 60 rolls over to the top of the screen is displayed. Furthermore, in a state 54 in which the top portion of the controller is tilted upward, the X-axis acceleration data is also x=0, but the Y-axis acceleration data y=y2 is a negative value. In this case, an image is generated so that a screen in which the character 60 rolls over to the bottom of the screen is displayed. If the value of either the X-axis acceleration or the Y-axis acceleration is 0, the moving direction of a character remains unchanged independently of the magnitude of acceleration. On the other hand, a screen display is performed by image generation processing so as to change the moving speed of the character in accordance with the magnitude of the X-axis or the Y-axis acceleration data.

However, if the acceleration is detected in regard to both the X-axis and the Y-axis, the moving direction of the character has to be determined based on the comparison between the magnitudes thereof. In the case where the X-axis acceleration is equal to the Y-axis acceleration and y=x (x>0, y>0), it is determined that the moving direction is diagonal and upwards as shown by arrow 55. Similarly, in the case where x>y (x>0, y>0), it is determined that the moving direction is a direction closer to the X-axis to some extent compared to the arrow 55, which is shown by arrow 56. Also, in the case where x<y (x>0, y>0), it is determined that the moving direction is a direction closer to the Y-axis to some extent compared to the arrow 55, which is shown by arrow 57. Then, image generation processing is performed so as to generate an image of the character 60 rolling over in the determined direction as described above, and change the moving speed of the character in accordance with the magnitude of acceleration of rolling for displaying the generated image on the screen.

Note that the determined direction as described above has to be considered as an example, and another direction may be determined in accordance with the detected magnitude of acceleration.

Figure 5:
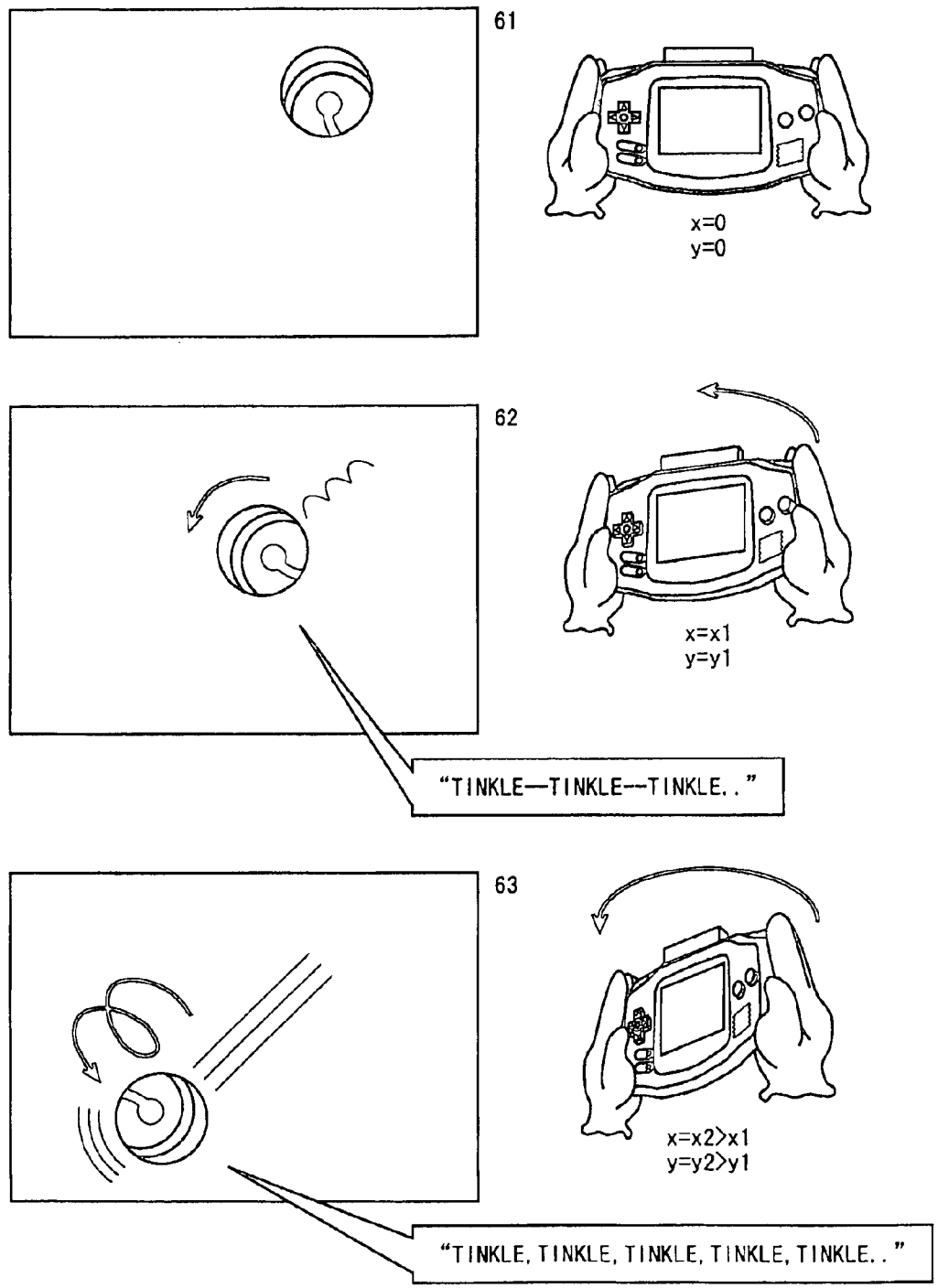
FIG. 5 is a schematic illustration showing exemplary changes of a character image and sound in accordance with the tilt operation.

With reference to FIG. 5, changes of an image and sound of the character 60 in accordance with a tilt operation of the controller 12 is described.

Assume that, in the game, the character 60 is a bell-shaped character producing sound while rolling over in a display screen in response to the tilt operation of the controller. A status illustration 61 represents a status of a game screen displayed on the image display device 15 and the controller 12 (or the handheld game device 13) when no tilt operation is performed. In this case, the acceleration of the controller 12 is 0 due to no tilt operation. That is, the X-axis and the Y-axis acceleration data obtained by the tilt sensor 12c is x=y=0.

In the above-described case, assume that the character data is, for example, the aforementioned character data A. In this case, an image of the character is generated by the image generation program 2 using the designated image data 1 (an image of a bell). If the image generation program 2 does not generate the image moving on the screen display when the X-axis and the Y-axis acceleration data is x=y=0, the character 60 is displayed as a still image as shown in the status illustration 61. On the other hand, sound of the character is generated by the sound program 1 using the designated sound data (sound of a bell). In this case, if mute processing is performed when the X-axis and the Y-axis acceleration data is x=y=0, that is, when the image is not moved, the sound of the character 60 is not produced as shown in the status illustration 61.

Next, a status illustration 62 is described. Assume that the X-axis acceleration data is x=x1, and the Y-axis acceleration data is y=y1. Also assume that the magnitude of tilt is relatively small as shown in the status illustration 62. In this case, the image generation program 2 uses the image data 1 and the acceleration data (x, y)=(x1, y1) for generating animation in which the bell-shaped character 60 rolls over slowly, and displays the generated animation. Concurrently, the sound program 1 changes, for example, a data reading interval of the sound of a bell ("tinkle") of the sound data 1 using the acceleration data (x, y)=(x1, y1), and produces the sound of a bell "tinkle—tinkle—" whose interval is relatively lengthened. As a result, it is possible to produce the effect of making the bell-shaped character appear to slowly roll down a gentle slope.

Next, a status illustration 63 is described. Assume that the X-axis acceleration data is x=x2, and the Y-axis acceleration data is y=y2. Also assume that x2>x1 and y2>y1, and the magnitude of tilt is relatively large as shown in the status illustration 63. In this case, the image generation program 2 uses the image data 1 and the acceleration data (x, y)=(x2, y2) for generating animation in which the bell-shaped character 60 rapidly rolls over, and displays the generated animation. Concurrently, the sound program 1 changes the data reading interval of the sound of a bell ("tinkle") using the above-described acceleration data (x, y)=(x2, y2), and produces the sound of a bell "tinkle, tinkle, tinkle." whose interval is relatively shortened. As a result, it is possible to produce the effect of making the bell-shaped character appear to roll down a steep slope.

As such, an image and sound of a character operated by a player are concurrently changed in accordance with the tilt of the controller 12, whereby the player can experience a realistic sensation when operating the character of the game. Thus, it is possible to attract the interest of the player. Here, assume that, for example, a sound program (a sound program 2 shown in FIG. 3) switching the sound of the game between two types of sound is used. In this case, assume that a character (not shown) whose behavior is lovely is displayed. When the amount of tilt operation of the controller 12 is small, sound such as a hum, etc., is produced (that is, sound data of a hum is read from the sound data storage area 46) while the character walks slowly in the tilt direction. On the other hand, when the amount of tilt operation becomes great, sound of a cry is produced while animation in which the character rolls down in the tilt direction is generated after displaying a panic-stricken gesture of the character. In this case, the sound program 2 sets a threshold value, about the acceleration data detected by the tilt sensor, for reading the sound data of a hum when the acceleration data is equal to or smaller than the threshold value, and reading the sound data of a cry when it is greater than the threshold value. As a result, the player operating the controller can be easily connected to the character, whereby it is possible to further attract the player to the game.

Furthermore, a sound program (a sound program 3 shown in FIG. 3) focusing only on sound, that is, converting the sound data itself in accordance with a tilt operation can be used. Conversion of the sound data can allow, for example, a stored value of the sound data to be changed to a larger value for changing the volume of the sound. A frequency of the sound data can also be changed for changing the tone interval of the sound. Furthermore, the form of the sound data itself can be changed by filtering processing, etc., for changing the tone of the sound. Combinations of the degree of the sound conversion as described above and an output from the tilt sensor, which is obtained in accordance with the tilt operation, allow more interesting staging effects to be obtained. For example, the tone of the sound becomes bright when the controller is tilted heavily, but the tone of the sound becomes dark when the controller is tilted slightly.

Still further, a sound program combining processing for changing a data reading interval of the sound, processing for changing the read data, and processing for converting the sound data can be used. The use of the above-described sound program allows more advantageous staging effects to be obtained.

With reference to FIG. 6, program processing according to the present invention is described. After the game device 10 is started, a program and data necessary for a game process is read from the external storage medium 14 at step S11, and the read program and data are stored in the RAM 22. Then, the controller 12 (or 13) is placed in the waiting state for accepting an input from the player. The game process is then started at step S12. The game process is executed by repeating the program steps from step S12 to step S22.

At step S13, the CPU 21 obtains output data from the acceleration sensor based on the main program, and stores an output value of the acceleration sensor in the acceleration sensor output data storage area 47. Then, at step S14, the magnitude and the direction of tilt of the controller 12 (or 13) are detected based on the output of the acceleration sensor, which is stored in the acceleration sensor output data storage area 47.

Next, at step S15, by referring to the character data storage area 42, a character image and character sound to be changed in accordance with the tilt of the controller are determined.

Then, at step S16, the image generation program designated by the data stored in the character data storage area 42 reads the image data, and generates a character image based on the magnitude and the direction of tilt, which are detected at step S14.

Then, at step S17, the sound program designated based on the same character data used at step S16 reads the sound data, and generates the sound based on the magnitude and the direction of tilt, which are detected at step S14.

At step S18, it is determined whether or not an image and sound corresponding to each of the other characters are generated after generation of the image and the sound of one character is completed. If it is determined that the image and the sound are generated corresponding to each of the other characters, the game process goes back to step S15 for repeating the program processing from step S15 to step S17 until generation of the image and the sound corresponding to each of all the other characters to be processed is completed.

On the other hand, if it is determined at step S18 that the image and the sound corresponding to each of the other characters are not generated, the game process proceeds to step S19. At step S19, the character image generated at step S16 is displayed on the image display device 15 in accordance with the image output program 34. Then, at step S20, the sound generated at step S17 is output from the sound output device 16 in accordance with the sound output program 35.

Finally, at step S21, it is determined whether or not the game is ended. If it is determined that the game is not ended, the game process goes back to step S12, and obtains new output data of the tilt sensor for continuing processing. Otherwise, the game is ended.

Note that, in the above-described embodiment, the game device 10 is assumed to include the controller 12 (or the handheld game device 13) having the built-in tilt sensor 12c, and the image display device 15 provided independently of the main unit 11. It is understood that the present invention can be easily adapted to a game device integrally provided with a display function and a controller function, such as the handheld game device 13.

While the invention has been described in detail, the foregoing description is in all aspects illustrative and not restrictive. It is understood that numerous other modifications and variations can be devised without departing from the scope of the invention.

What is claimed is:

1. A game device that causes a display to display a game image including a character operated by a player, and causes a sound generation unit to output game sound corresponding to the character in accordance with an operation performed by the player, comprising:

an operation controller operated by the player;

a tilt detector built-into the operation controller for detecting an amount of X and Y tilt in accordance with a tilt of the operation controller;

a determination mechanism for determining whether or not the output value of the tilt detector is greater than a predetermined value;

a game processor for processing a game in accordance with the operation performed by the player;

an image storage area for storing image data used for displaying the character;

a sound data storage area for storing sound data of sound to be produced by the character;

an image display processing unit for reading the image data of the character from the image data storage area and causing the display to display an image of the character; and a sound output processing unit for reading the sound data from the sound data storage area and causing the sound generation unit to output sound related to the image of the character while the image of the character is displayed by the image display processing unit, wherein the image display processing unit and the sound output processing unit respond to a change in output of the tilt detector, which changes in accordance with the tilt operation performed by the player with the operation controller, and change the game image displayed by the display and the game sound output from the sound generation unit concurrently and in an associated manner, wherein the sound data storage area stores at least a first type of sound data and a second type of sound data for one character, and the sound output processing unit selects either of the first type of sound data and the second type of sound data based on an output value of the tilt detector and reads the selected first or second type of sound data, wherein the first type of sound data corresponds to sound that is used when the displayed character moves faster than a predetermined speed, the second type of sound data corresponds to sound that is used when the displayed character moves slower than the predetermined speed, and the sound output processing unit reads the first type of sound data when it is determined by the determination mechanism that the output value of the tilt detector is greater than the predetermined value, and reads the second type of sound data when it is determined by the determination mechanism that the output value of the tilt detector is equal to or smaller than the predetermined value.

2. The game device according to claim 1, wherein the sound output processing unit changes an interval of reading the sound data from the sound data storage area in accordance with the output of the tilt detector.

3. The game device according to claim 1, wherein the tilt detector is an acceleration sensor for detecting a magnitude of acceleration exerted at least on a lateral and a longitudinal direction of the operation controller.

4. The game device according to claim 1, wherein the operation controller is grasped by the hands of the player and comprises at least one operation device manipulable by a finger of one of the player's hands.

5. The game device according to claim 1, wherein the operation controller is grasped by the hands of the player and comprises operation devices positioned on opposite sides of a display, the operation devices being manipulable by fingers of the player's hands.

6. A method for use with a hand-held video game control device adapted to be grasped by the hands of a player and which is operatively connected to a game processing system for executing a video game program, the method comprising:

receiving tilt data indicative of a tilt of the hand-held video game control device in at least two dimensions when the hand-held video game control device is grasped by the hands of the player; and using the tilt data to concurrently change, in an associated manner, a display of a character of the video game program executed by the video game processing system and sound produced by the character, wherein if the tilt data is determined to be indicative of a tilt greater than a specified value, a first sound is produced by the character and if the tilt data is determined to be indicative of a tilt not greater than the specified value, a second different sound is produced for the character.

7. The method according to claim 6, wherein the tilt data comprises X and Y tilt data.

8. The method according to claim 6, further comprising:

receiving Z-direction movement data indicative of Z-direction movement of the hand-held video game control device.

9. A storage device storing computer-executable instructions for performing a method for use with a hand-held video game control device adapted to be grasped by the hands of a player and which is operatively connected to a game processing system for executing a video game program, the method comprising:

receiving tilt data indicative of the tilt of the hand-held video game control device in at least two dimensions when the hand-held video game control device is grasped by the hands of the player; and using the tilt data to concurrently change, in an associated manner, the display of a character of the video game program executed by the video game processing system and sound produced by the character, wherein if the tilt data is indicative of a tilt greater than a specified value, a first sound is produced by the character and if the tilt data is indicative of a tilt not greater than the specified value, a second different sound is produced for the character.

10. A video game system comprising:

a hand-held control device adapted to be grasped by the hands of a player and comprising at least one operation device manipulable by a finger of one of the player's hands;

a tilt detector for detecting tilt of the control device in at least two dimensions when the hand-held control device is grasped by the hands of the player;

a game processing system for executing a video game program for a video game to generate at least one character image for display on a display unit and to generate sound for the at least one character image for output by a speaker, wherein the display of at least one character and the sound generated for the at least one character are changed concurrently based on the detected tilt, and the game processing system determines whether the detected tilt is greater than a predetermined value and generates first sound for the at least one character if the detected tilt is greater than the predetermined value and second different sound for the at least one character if the detected tilt is not greater than the predetermined value.

11. The video game system according to claim 10, wherein the tilt detector comprises at least one accelerometer.

12. The video game system according to claim 10, wherein the hand-held control device comprises operation devices positioned on opposite sides of a display.

* * * * *